Sept. 28, 1965

J. J. DICKSON 3,208,914

NUCLEAR REACTOR WITH IMPROVED CORE ARRANGEMENT
FACILITATING LOADING AND UNLOADING OF FUEL
ASSEMBLIES AND CONTROL ROD ASSEMBLIES

Filed Jan. 5, 1961

Inventor
James J. Dickson
by Fabian A Brusok
Attorney

Sept. 28, 1965
J. J. DICKSON
3,208,914
NUCLEAR REACTOR WITH IMPROVED CORE ARRANGEMENT
FACILITATING LOADING AND UNLOADING OF FUEL
ASSEMBLIES AND CONTROL ROD ASSEMBLIES
Filed Jan. 5, 1961
8 Sheets-Sheet 4
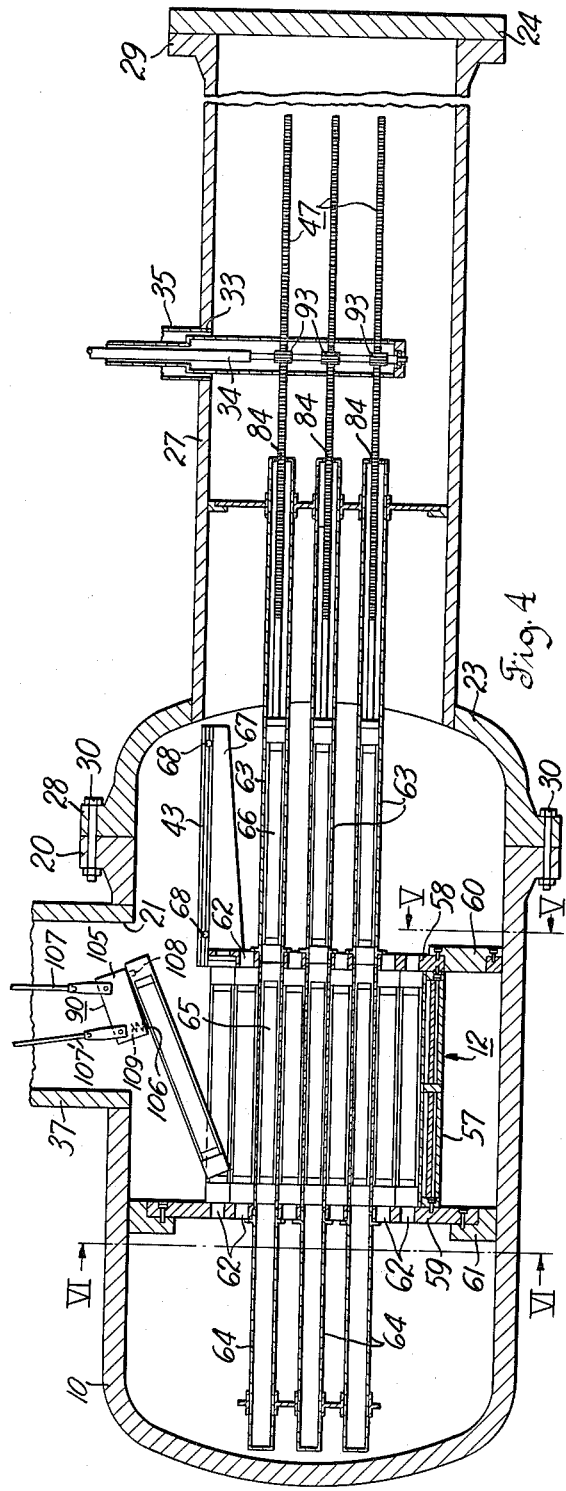
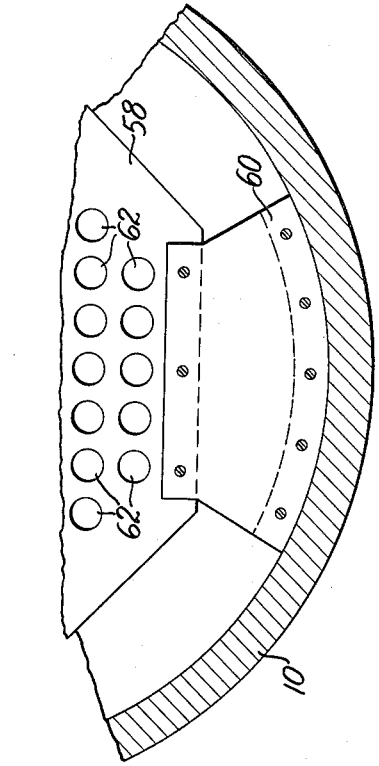
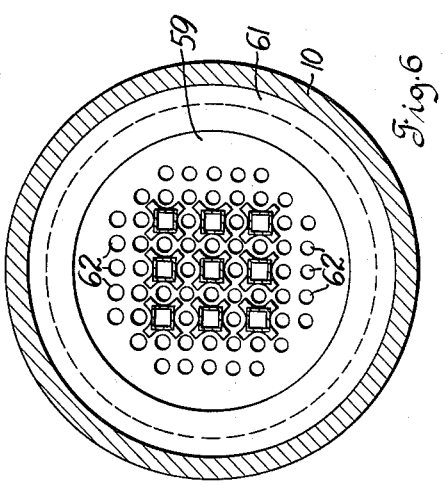
Inventor
James J. Dickson
By Fabian A. Brusok
Attorney

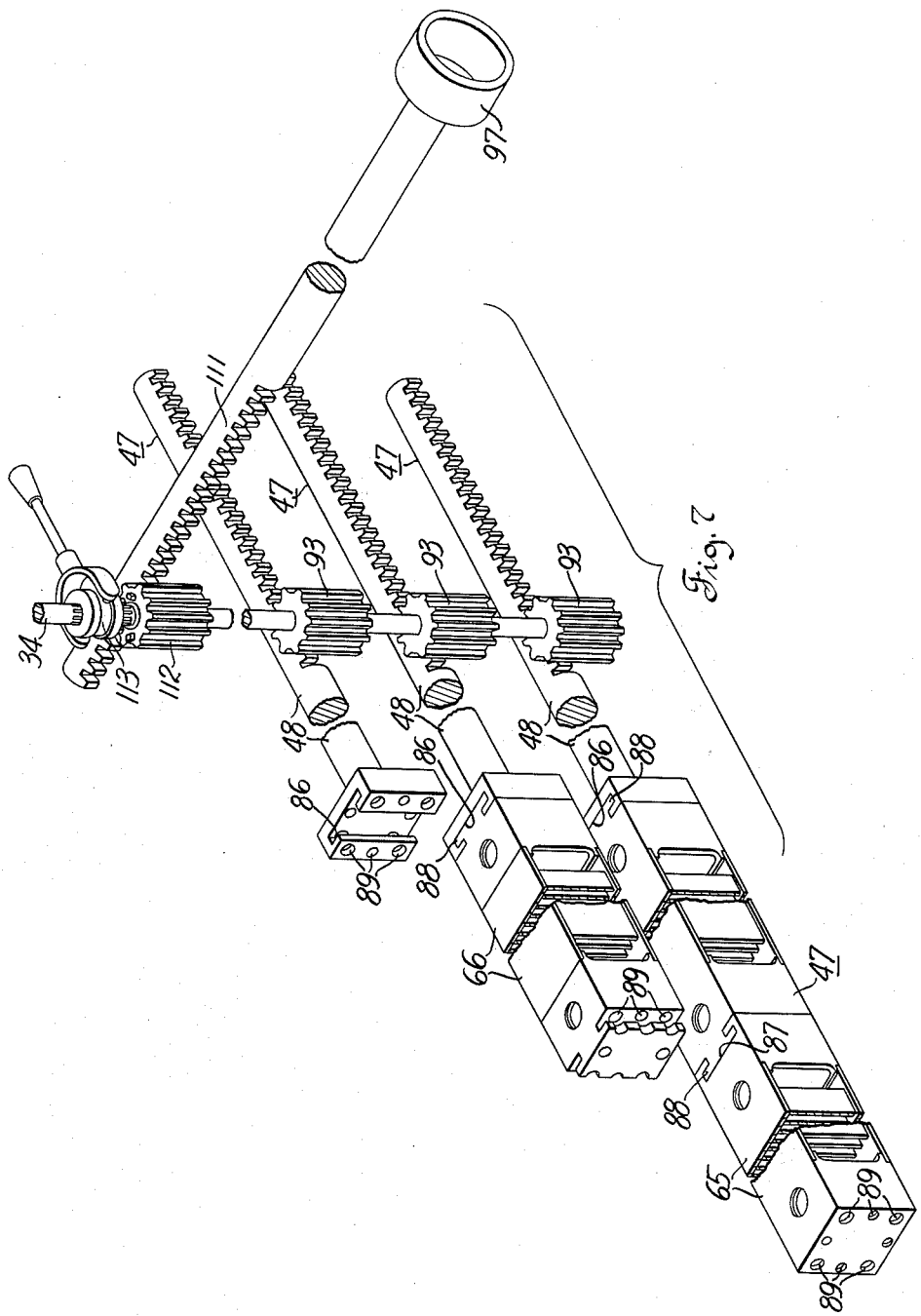

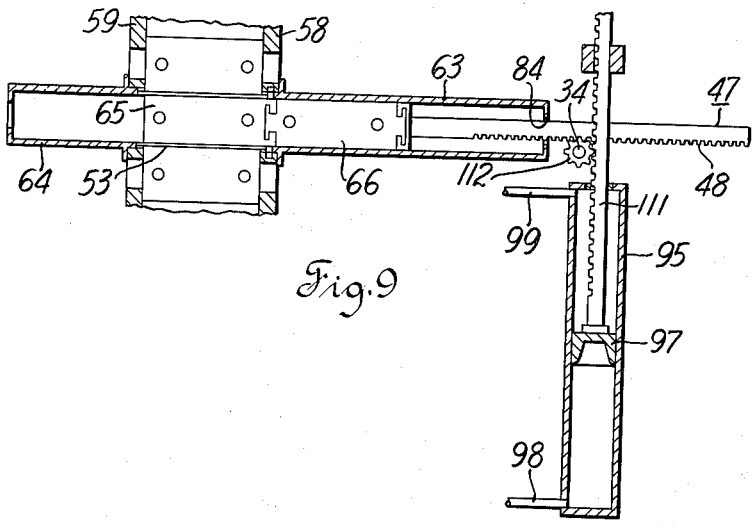
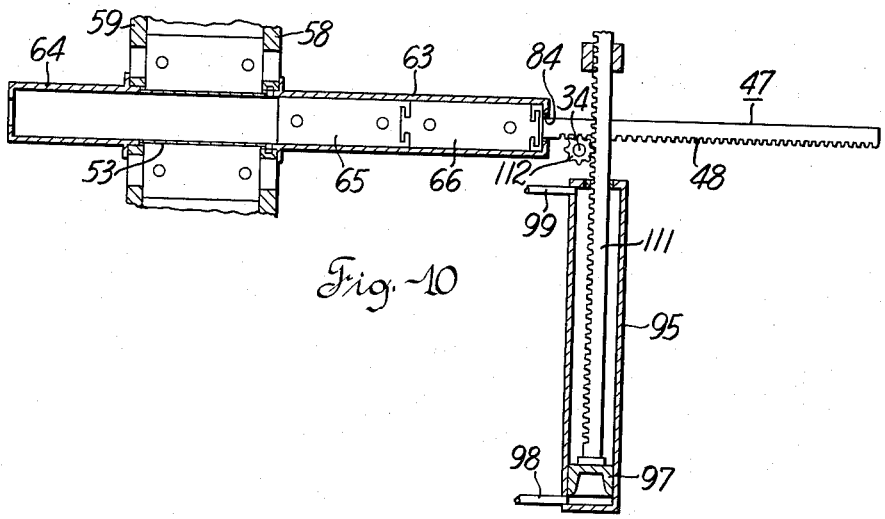

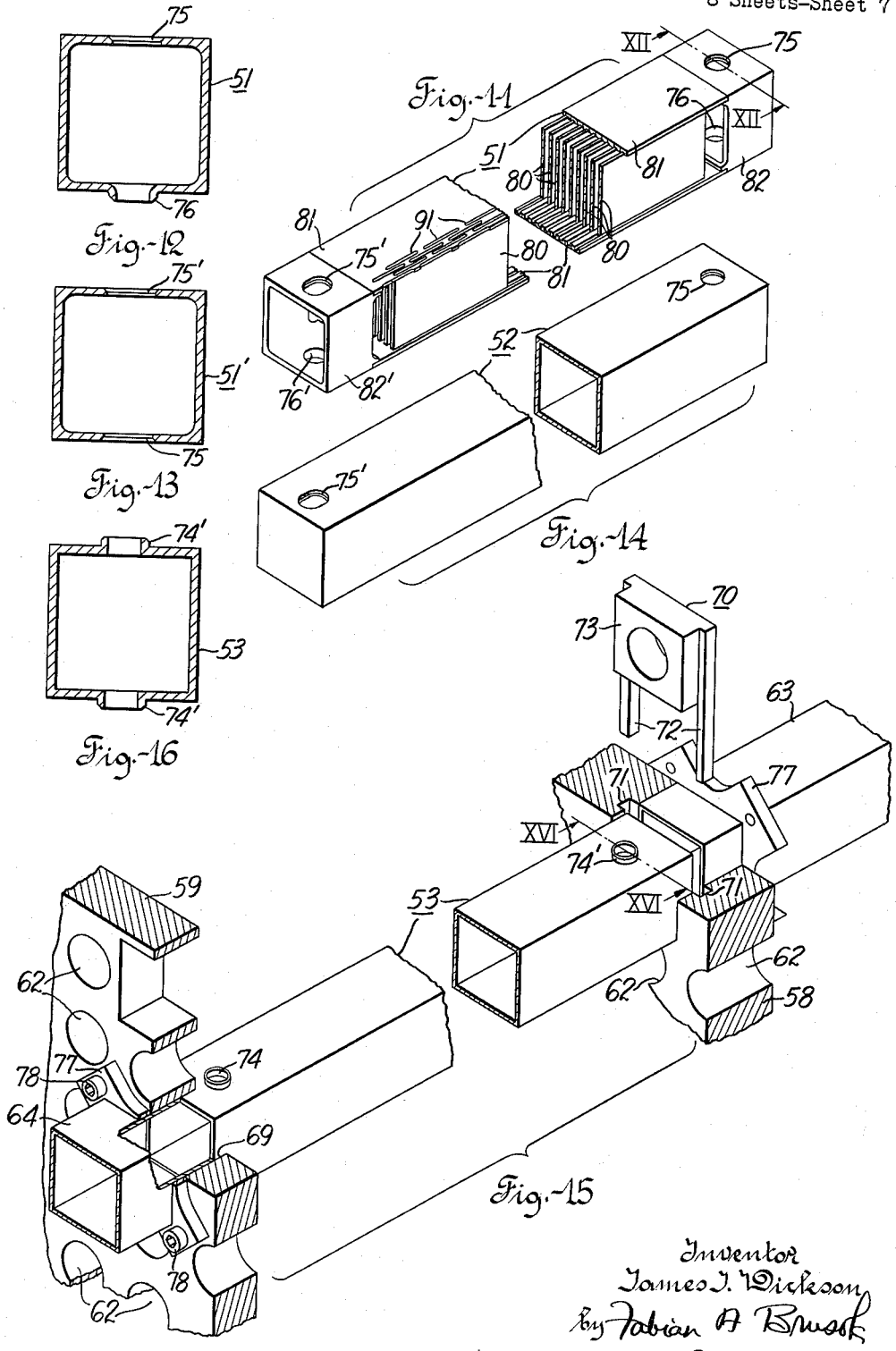

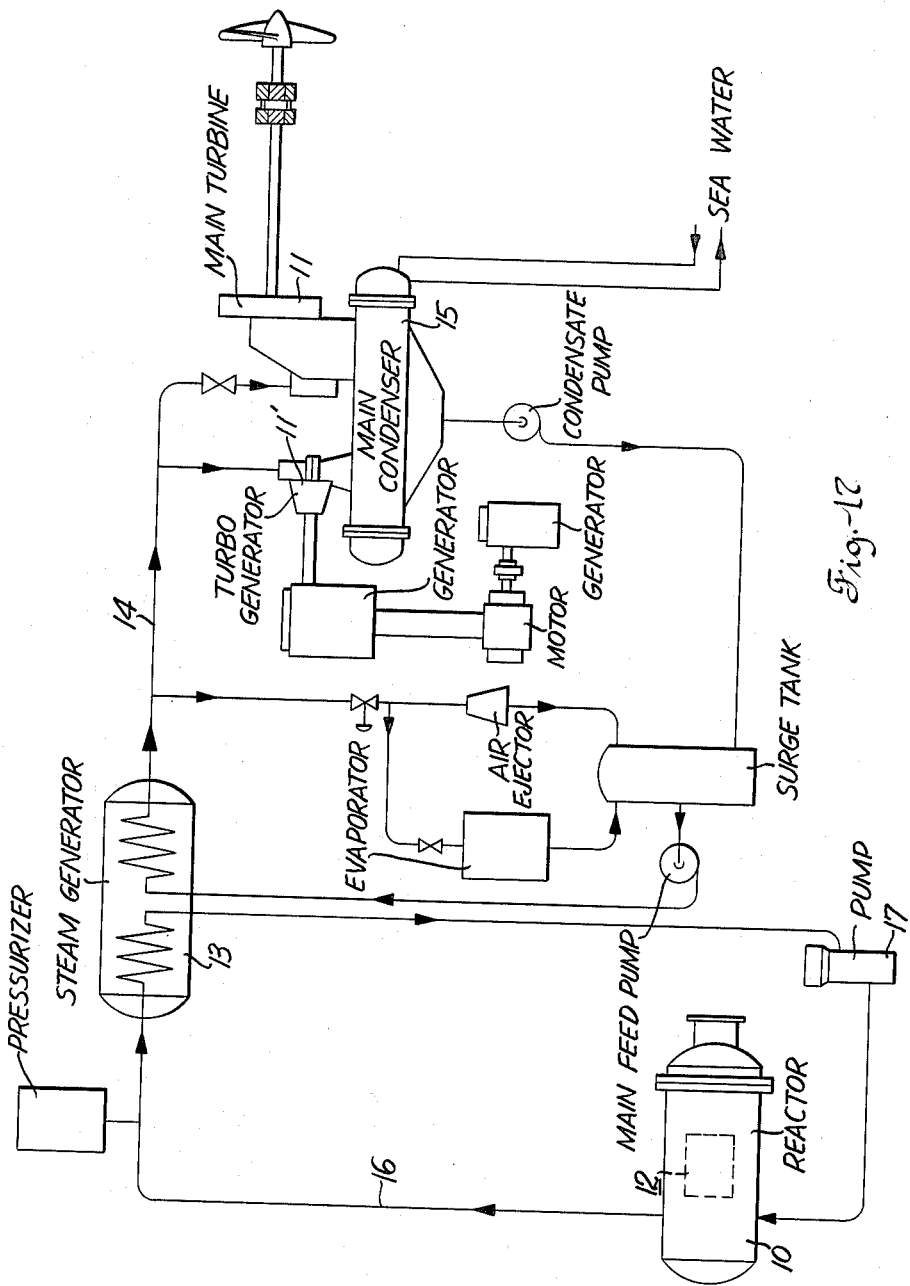

United States Patent Office 3,208,914
Patented Sept. 28, 1965

3,208,914
NUCLEAR REACTOR WITH IMPROVED CORE ARRANGEMENT FACILITATING LOADING AND UNLOADING OF FUEL ASSEMBLIES AND CONTROL ROD ASSEMBLIES
James J. Dickson, Silver Spring, Md., assignor to Allis-Chalmers Manufacturing Company, Milwaukee, Wis.
Filed Jan. 5, 1961, Ser. No. 80,774
6 Claims. (Cl. 176—30)

This invention relates to nuclear reactors, and more particularly to power reactors which are adapted for use in mobile units as a source of propelling power.

Various types of neutronic reactors including pressurized water as well as boiling water and gas cooled (graphite moderated) types have heretofore been proposed for use in self-propelled units. However, the provision of an atomic power plant for mobile units which is satisfactory not only in its technical but also in its various practical aspects presents problems, difficulties and requirements which are peculiar to the environmental and operational conditions of the unit and which are not ordinarily encountered in land based stationary or fixed site installations.

For instance, in the conventional fixed site installation of water cooled and moderated reactors the reactor vessel and core are normally set up in a vertical position, the control rods are moved axially of the core, shielding is placed not only around the reactor vessel but also above and below it, and the actuating mechanism for the control rods is located generally at one end of the reactor vessel. Such an arrangement of the reactor complex in a stationary installation presents no particular problems in terms of operability, installed or total cost of the reactor complex, or in accessibility of reactor components for inspection, repair, outage and overhaul. However, in mobile units and in submarines in particular, the conventional vertical arrangement of the reactor entails considerable difficulties due to prevailing environmental and operational conditions. Specifically, in a submarine, the use of reactors with high head room determines the diameter of the pressure hull and hence the silhouette which in turn governs its relative detectability as submerged. The load concentration of the conventional high head reactor, with its heavy shielding also does not allow distribution of loads in the hull to avoid areas of high stress concentration. The metacenter of the vessel cannot be kept as high as would be desirable because of the relatively high location of the center of gravity of the vertically positioned reactor complex.

A further disadvantage of the conventional vertical reactor arrangement in a submarine is the requirement of fuel withdrawal through a considerable distance from the core to the transfer or shipping cask employed as a protective container. This installing or removal distance gives manipulative difficulties in groping for and attachment of fuel elements.

Another difficulty which is characteristic of the use of vertical reactors in self-propelled units, and particularly in submarines, arises from the change of inclination from the vertical to which the reactor becomes subjected in such use and which, in a submarine, may involve very steep angles fore and aft in dive and surfacing operations. Roll and pitch of the vessel in heavy seas while floating, diving or surfacing must also be anticipated. These conditions affect the gravitational forces on the moving and movable parts of the reactor system as well as the water and steam separation. They may also cause shifting of the water level in the reactor vessel and thereby create a danger of momentary excessive radiation.

Generally, it is an object of the invention to provide an improved nuclear reactor which lends itself to use as to power source for mobile units and which will take care of the mentioned and other difficulties and requirements of such use in a practical and entirely satisfactory manner.

More specifically, it is an object of the invention to provide an improved nuclear reactor for use in mobile units which affords a relatively low center of gravity as compared with the conventional vertical reactor arrangement.

Another object of the invention is to provide an improved nuclear reactor of the above outlined character employing a reactor vessel which is mounted to lie on its side rather than to stand on end, and control rods which are reciprocable endwise of the reactor vessel so that no head room above or below the reactor vessel will be needed to accommodate the reciprocating movement of these rods.

A further object of the invention is to provide an improved nuclear reactor of the above outlined character wherein access to fuel elements within the reactor vessel is afforded through a top opening intermediate the axially opposite ends of the reactor vessel, and wherein the fuel elements are constructed and arranged so that they may be moved generally endwise through the top opening for loading and unloading the reactor vessel, and may be placed into lengthwise extending operative positions within the reactor vessel.

A further object of the invention is to provide an improved nuclear reactor of the above outlined character wherein control rods are movable axially of the vessel to different positions of adjustment including a scram position, various regulating positions, and a core unloading position wherein the control portions of the rods are entirely withdrawn from the active core region to facilitate installation of the fuel elements within and their removal from the reactor vessel through the mentioned top opening.

A further object of the invention is to provide an improved mechanism for actuating the control rods of a nuclear reactor of the above mentioned character, the mehanism being operable by one power source, such as an electric motor, to adjust a control rod or rods to various regulating positions, and by another power source such as a pneumatic cylinder, to actuate the control rods to scram positions. Adjustment of the control rods to the mentioned core unloading positions is preferably effected by means of the same power source which adjusts the control rods to their regulating positions.

A further object of the invention is to provide an improved fuel element and core construction for a nuclear reactor of the hereinabove outlined character, which permits close packing of the fuel elements and which introduces a minimum of neutron absorbing materials into the active core, which insures positioning and retention of the fuel elements in their installed operative positions within the reactor vessel in a simple and inexpensive manner, and which permits selective arrangement of the fuel elements within the reactor vessel in accordance with existing flux distribution and reactivity requirements.

A further object of the invention is to provide an improved power plant for submarines including a nuclear reactor of the hereinabove outlined character, and partial eccentric radiation shielding on the sides and top of the reactor vessel, radiation shielding below the reactor vessel being afforded by the water in which the submarine might be floating or submerged.

These and other objects and advantages are attained by the present invention, various novel features of which will be apparent from the description herein and the accompanying drawings disclosing an embodiment of the invention, and will be more particularly pointed out in the appended claims.

Referring to the drawings:

FIG. 4 is an enlarged section on line IV—IV of FIG. 3 with parts omitted and others added to illustrate a procedural step for servicing the reactor;

FIG. 5 is an enlarged partial end view taken along line V—V of FIG. 4;

FIG. 6 is a section taken along line VI—VI of FIG. 4;

FIG. 7 is an enlarged isometric schematic view of part of the reactor control mechanism;

FIGS. 8, 9 and 10 are diagrammatic views illustrating various conditions of adjustment of the control mechanism shown in FIG. 7;

FIG. 11 is an enlarged isometric view of a fuel element assembly with parts broken away to more clearly show the construction;

FIG. 12 is a section taken along line XII—XII of FIG. 11;

FIG. 13 is a cross section view similar to FIG. 12 showing the fuel assembly holes in the top and bottom;

FIG. 14 is an isometric view of a dummy fuel element with parts broken away to show the construction;

FIG. 15 is an isometric schematic view of a subassembly of parts shown in FIGS. 4 and 6, portions of the subassembly shown in FIG. 15 being broken away and shown in section;

FIG. 16 is a transverse cross section view taken along line XVI—XVI of FIG. 15; and FIG. 17 is a power flow diagram of a mobile nuclear power plant incorporating the reactor shown in FIGS. 1 through 16.

Figure 1:
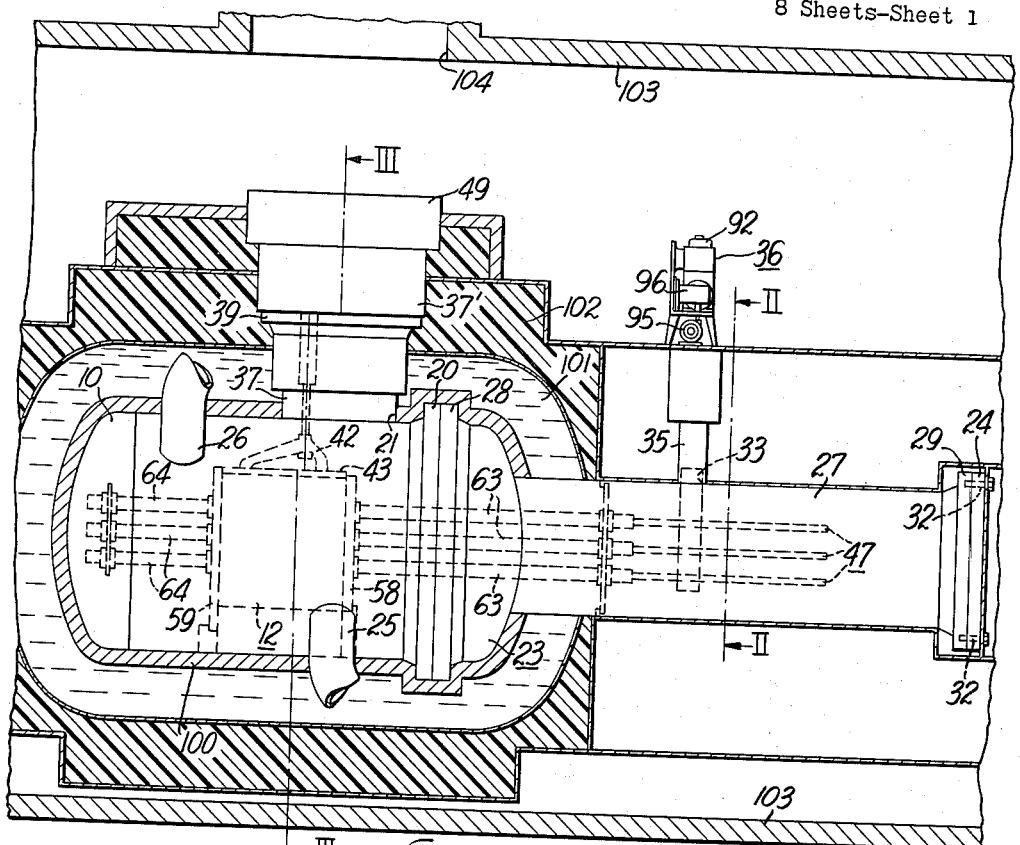
FIG. 1 is an elevational side view of a mobile nuclear reactor and environmental structure, part of the reactor and environmental structure being broken away and shown in section.

Referring to the drawings, a mobile nuclear power plant constructed according to this invention is schematically shown in FIG. 17 and includes a pressure vessel 10, a nuclear core 12, a primary coolant circuit 16 including pumping means 17, a heat exchanger 13, a steam circuit 14 including a main turbine 11, a turbo-generator 11' and a condenser 15, as well as a number of auxiliary apparatuses.

Referring to FIG. 1, a reactor pressure vessel 10 is a horizontally disposed vessel which is closed at one end and open at the other end and which has an outwardly extending flange 20 around its open end. The reactor has an access opening 21 which serves as a refueling port in an upper longitudinally extending side wall of the vessel 10, a refueling port cover 22, an end head 23, an end head cover 24 and coolant inlet and outlet ports 25, 26.

The end head 23 comprises a longitudinally extending tubular housing 27 having outwardly extending flanges 28, 29 at its ends, respectively, and forms a coaxial extension to vessel 10. Housing flange 28 abuts the vessel flange 20 and is attached thereto by means such as bolts 30. A cover 24 is attached to the other housing flange 29 by means such as bolts 32.

To provide adequate sealing, suitable gaskets (not shown) are disposed between flange 29 and cover 24 and flanges 20, 28, and light seal welds are made around the outer periphery of the joint between the flanges 20, 28 and the flange 29 and cover 24.

The end head 23 has three bores 33 defined therethrough transverse to the axis thereof for passage of three control rod drive shafts 34, only one of these bores and shafts being shown. Upward extending adapters 35 are disposed concentrically within the bores 33 and provide means for connecting the control rod drives 36.

The refueling port 21 (FIG. 3) includes an upward tubular extension 37 of the pressure vessel 10 having an internal shoulder 38 and an outward extending flange 39. A shield plug 40 having a shoulder 41 is disposed in the port 21 so that shoulders 38, 41 abut each other. A hold down tripod 42 (FIGS. 1 and 3) depends from shield plug 40 and may be disposed in thrust transmitting relationship against a hold down plate 43 to clamp the core elements against the shroud bottom 57 to maintain the geometric pattern of the core during reactor operation. The tripod 42 is offset from the axis of plug 40 and may be rotated 180 degrees to selectively actuate the tripod legs to a core clamping position and to a plug releasing position respectively. In the plug releasing position the tripod legs are aligned with the port 21 for removal with the shield plug 40 and in the core clamping position the tripod legs are disposed in thrust transmitting relationship against the hold down plate 43.

A cover plate 22 is provided for refueling port 21 and is removably mounted to the port flange 39 such as by bolts 46. A suitable gasket such as a metallic gasket (not shown) is disposed between the cover and flange to provide adequate sealing.

Radiation shielding described hereinafter surrounds vessel 10 and includes a removable outer plug 49.

Nuclear core 12 is centrally disposed in vessel 10 and comprises a shroud structure 55 having a compact stacked arrangement of core elements therein, the core elements including sixty fuel element assemblies 51, 51', six dummy fuel assemblies 52, nine control rod assemblies 47 and nine guide sleeves 53.

Shroud 55, having side and bottom portions 56, 57, is supported at each end by front and rear end plates 58, 59 (FIG. 4) that rest on front and rear rings 60, 61 (FIGS. 4 and 5) attached to the shell of vessel 10 as by welding. The rear end plate 59 is fixed to rear ring 61 and the front end plate 58 (FIGS. 4 and 5) is slidably mounted on front ring 60 to accommodate thermal expansion. The end plates 58, 59 have flow openings 62 defined therethrough and guide tube extensions 63, 64 extending therefrom to receive the reciprocable sections 65, 66 of each control rod assembly 47. Shroud 55 is open at the top to allow the core elements to be removed and replaced through the refueling port 21. A handling device such as grappling tool 90 shown in FIG. 4 and described hereinafter is provided to remove and replace the individual core elements.

A spring loaded hold down plate 43 (FIG. 3) is provided to close the top of shroud 55 and prevent movement of the core elements during operation of the reactor. A platform 67 (FIG. 4) extending axially outward from the core 12 is attached to the front core support plate 58 and serves to receive and support hold down plate 43 during refueling operations. The hold down plate 43 may be equipped with wheels 68 to facilitate moving the plate 43 to and from the platform 67.

Figure 3:
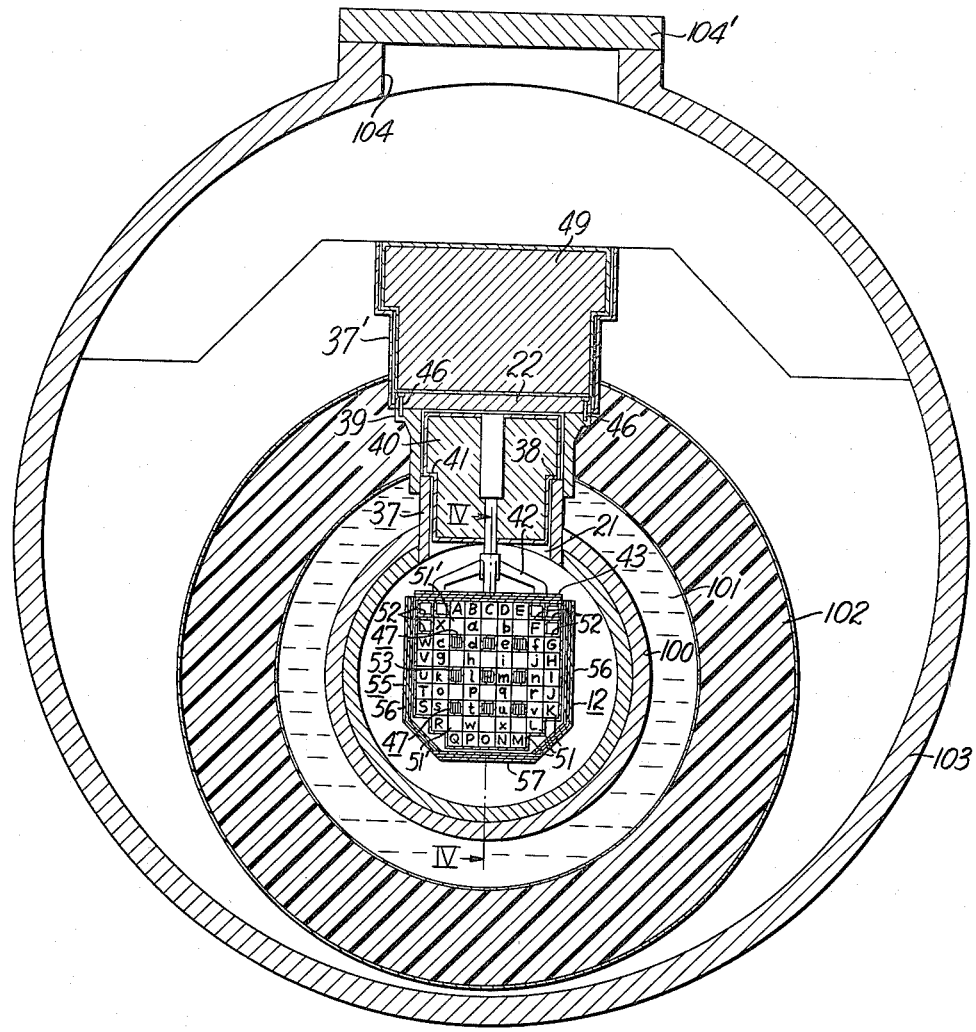
FIG. 3 is an enlarged section taken along line III—III of FIG. 1.

As shown in FIG. 3, the loaded cross section of the core 12 comprises movable and stationar core elements arranged to define an irregular hexagon. The stationary core elements comprise forty-eight fuel assemblies 51, twelve fuel assemblies 51', six dummy assemblies 52, and nine guide sleeves 53. The movable core elements comprise nine control rod assemblies 47. The core elements are arranged transverse to end plates 58, 59 and are stacked inside the shroud 55 so that each stacked up element rests upon an element below. The core assembly presents a uniform top surface, and the pressure exerted upon it by the hold down plate 43 not only secures the core elements against upward movement but also causes the core elements to bear upon each other so that the core geometry will be maintained during operation of the reactor.

The control rod guide sleeves 53 (FIG. 3) are removable in the same way as the fuel assemblies 51, 51' and have substantially the same circumferential dimensions as the fuel assemblies 51, 51', but are slightly longer than the latter. Referring to FIG. 15, alignment of the guide sleeves 53 with the respective guide sleeve extensions 63, 64 is achieved by a socket 69 and a keyed spacer arrangement 70 in the core end plates 59, 58 respectively. Sockets 69 are defined in the rear end plate 59 and the front end plate 58 has suitable keyways 71 defined therein to receive keyed spacer 70. Each spacer 70 is provided with legs 72 that are received by keyways 71 in the front end plate 58 and a square boxlike portion 73. The length of the legs 72 measured from their distal ends to the body 73 is equal to the height of the guide sleeve 53, and the portion 73 is of the same height and width as a fuel assembly whose height and width are in turn equal to the height and width of the sleeve 53. The axial thickness of the boxlike portion 73 is greater than the axial width of the keyways 71.

The guide sleeves 53 are disposed between the front and rear end plates 58 and 59 by lowering each sleeve 53 into its respective location in the shroud 55 during the normal sequential loading operation, and pushed rearward until seated in its rear end plate socket 69. A keyed spacer 70 is then inserted in a front end plate keyway 71 to accurately position and lock the sleeve 53 in the core. The spacer legs 72 abut the end of the guide sleeve 53 to prevent axial displacement thereof. The square boxlike portion 73 of spacer 70 rests on the guide sleeve 53 to accurately space the guide sleeve 53 directly above and provide a flush interior surface on the front end plate 58 directly above the guide sleeve 53.

The guide sleeves 53 are registered with the fuel assemblies 51' immediately above and below by providing outward extending pins 74' (FIGS. 15 and 16) having bores 74 coaxially therewith in the end portions of the upper and lower surfaces thereof. The provision of only pins 74' on the guide sleeve 53 removes the possibility of having a fuel assembly pin 76 (FIG. 12) extend into a guide sleeve 53 and cause the reciprocable control rod assembly 47 to jam. The pins 74 are received by the holes 75 in the hereinafter described fuel assemblies 51' disposed below and above the guide sleeves 53.

The guide sleeve extensions 63, 64 (FIG. 4) have flanges 77 (FIG. 15) associated therewith and are removably attached to the axially outward side of the end plates 58, 59, respectively, as by bolts 78 and extend parallel to the core axis. Because of the relative inaccessibility of the guide sleeve extensions 63, 64 each guide sleeve extension 63, 64 is provided with Stellite faced surfaces to reduce wear. Thus, the wear is largely confined to the removable portions of the control elements which are readily removed and replaced during normal refueling operations.

The fuel assemblies 51, 51' are boxlike assemblies of parallel flat plates 80 spaced from each other by side plates 81. By way of a practical example, each fuel plate 80 is 24 inches long and 0.030 inch thick and comprises fully enriched uranium dioxide particles dispersed in a matrix of stainless steel and clad with low carbon stainless steel. Boron may be used as a burnable poison to increase the allowable initial loading and to extend the life of the assemblies.

Fuel assemblies 51, 51' are assembled by arranging the fuel plates 80 in a spaced parallel configuration having the edge portions of the fuel plates 80 abut the side plates 81, brazing the fuel plates 80 to the side plates 81, and welding end boxes 82, 82' to the side plates 81.

The end boxes 82, 82' are provided with round nosed pins 76, 76' (FIGS. 11 and 12) on one side and holes 75, 75' on the opposite side. The hole 75 in end box 82 is the same size as the pin 76 and the hole 75' in end box 82' is slightly enlarged to accommodate thermal axial expansion and contraction of the core elements. The holes 75, 75' receive the pins 76, 76' from the fuel assembly disposed above, and one of the holes of each fuel assembly may also receive a grappling tool 90 discussed hereinafter for removing and replacing the fuel assemblies.

Fuel assemblies 51' disposed above and below the guide sleeves 53 differ from fuel assemblies 51 by having only holes 75, 75' (FIG. 13) in the end boxes 82, 82' and receive the pins 74 extending from the guide sleeves 53. In other respects the fuel assemblies 51 and 51' are identical.

The dummy fuel assemblies 52 (FIG. 3) are unitary square tubes closed at the ends to prevent coolant from bypassing the active assemblies 51, 51' and have similar external dimensions as assemblies 51. In the absence of end boxes 82, 82' on the dummy assemblies, the pins 76, 76' and holes 75, 75' are defined in the end portions of the dummy assemblies 52 and have the same axial spacing as the pins and holes in assemblies 51.

It is to be noted that the fuel assemblies 51, 51' as herein disclosed do not utilize end adapters that require accurate registration with conventional core end or grid plate coolant inlet and outlet ports. Thus, the core elements may be closely packed, one upon the other, providing mutual reinforcement of adjacent core elements, thereby eliminating individual core element supports. In addition, the fuel assemblies 51, 51' and dummy assemblies 52 are alike at either end which permits end to end reversal thereof during the core loading.

The core is controlled in conventional fashion (FIGS. 2, 6 through 10) by nine control rod assemblies 47 in a three times three array around the core center line. The reactor power is adjusted by endwise movement of the rods 47 between a scram position (FIG. 8) and an operating position (FIG. 9). The depletion or the burnable boron, if utilized, also adjusts the amount of available fission material. The control rods 47 are of square cross sectional configuration and are dimensioned to fit the space within the guide tube 53. Each rod assembly 47 comprises three detachably interconnected sections; namely, a fuel section 65, a poison section 66 and a rack section 48.

As shown in FIG. 7, the control rod assemblies 47 are sequentially assemblied in an end to end relationship by coupling means utilizing a dovetail arrangement at the ends of the sections. The rack section 48 is provided with a T-slot 86; the fuel section 65 is provided with a T-slot 87 at one end thereof; and the poison section 66 is provided with T-heads 88 at its opposite ends. To assemble the control rod assembly 47, only the poison section 66 can be coupled to the rack section 48, and the fuel section 65 can only be coupled to the poison section 66. This arrangement prevents accidental coupling of the fuel section 65 directly to the rack section which would dispose a fuel section 65 in the core geometry during a "scram."

Figure 2:
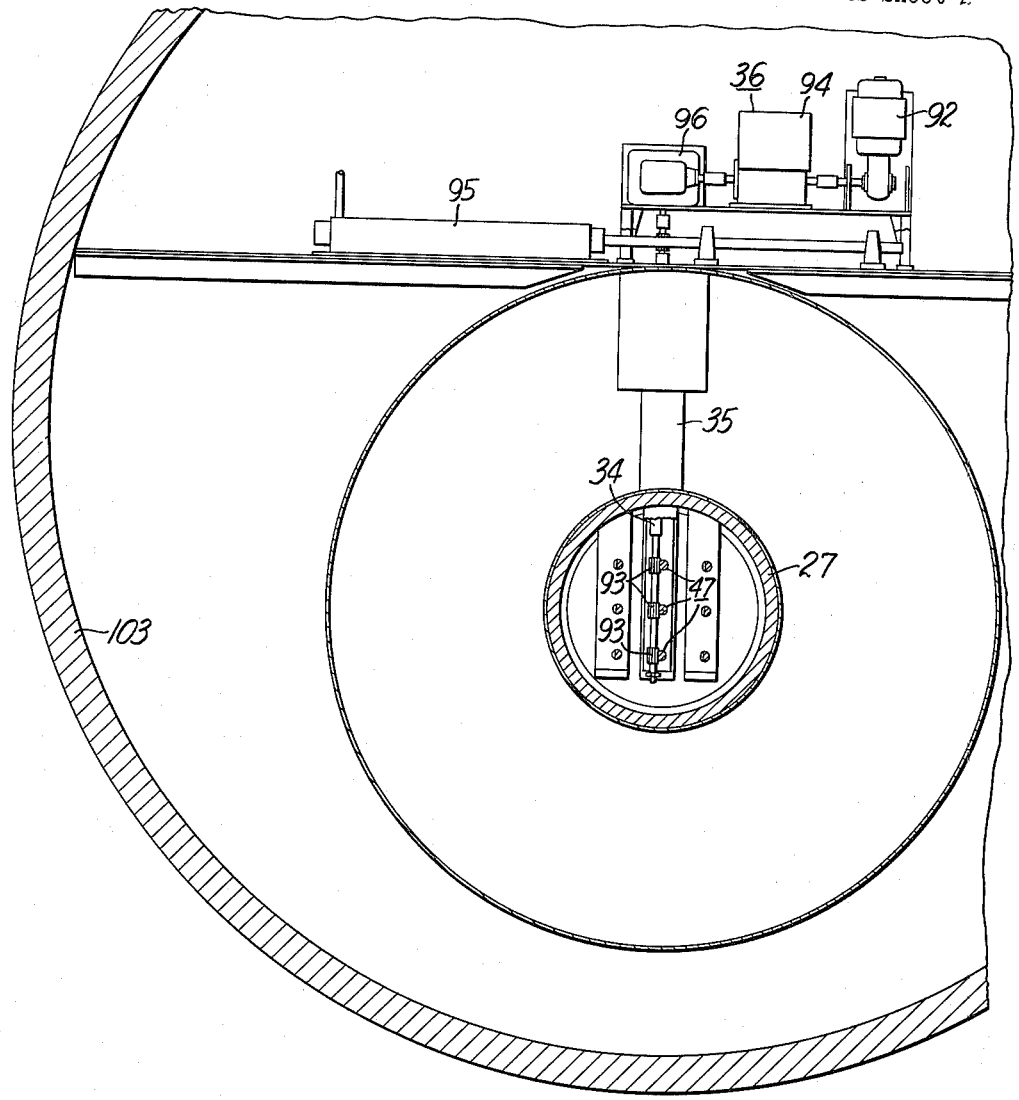
FIG. 2 is an enlarged section taken along line II—II of FIG. 1, part of the environmental structure being broken away.

As shown in FIGS. 1, 2 and 4, control rod drive mechanism 36 is removably mounted above vessel 10 and is supported on the tubular housing 27 by adapter 35. Shaft 34 (FIGS. 4 and 7) depending downward from each drive mechanism 36 through the adapter 35 is provided with three pinion gears 93 to engage each rack 48. The drive mechanism 36 includes on electric gear motor 92, magnetic clutch 94, gear box 96, rod position indicator (not shown), limit switches (not shown), and a pneumatic cylinder 95 for fast scrams. The magnetic clutch 94 transmits torque from the drive motor 92 to the gear box 96 when energized and is disposed between the drive motor 92 and gear box 96. The pneumatic scram cylinder 95 is disposed on a level below gear box 96 and is operatively coupled to drive shaft 34 during a scram. The scram mechanism is fail safe; that is, a loss in power deenergizes the magnetic clutch 94 to disconnect the electric motor 92 from the gear box 96 and permits the pneumatic cylinder 95 to drive the fuel section 65 of the control rod assembly 47 out of the core lattice and simultaneously substitute the poison section 66.

During normal reactor operation both ends of the pneumatic scram cylinder 95 are vented through a threeway, spring loaded solenoid valve (not shown) so that the cylinder plunger 97 freely follows the pinion shaft 34.

The plunger 97 is provided with a rackline extension 111 (FIG. 7). A scram pinion 112 is slip mounted on drive shaft 34 and is in engagement with rack 111. A jaw clutch 113 is associated with scraw pinion 112 to alternatively engage pinion 112 to and disengage pinion 112 from shaft 34. During reactor operation, jaw clutch 113 is actuated to maintain pinion 112 in engagement with shaft 34. Thus, in the event of a scram, the movement of the plunger extension 111 is transmitted to the pinion gear and hence causes the shaft 34 to move the poison sections of the control rod assemblies 47 into the core 12.

Figure 8:
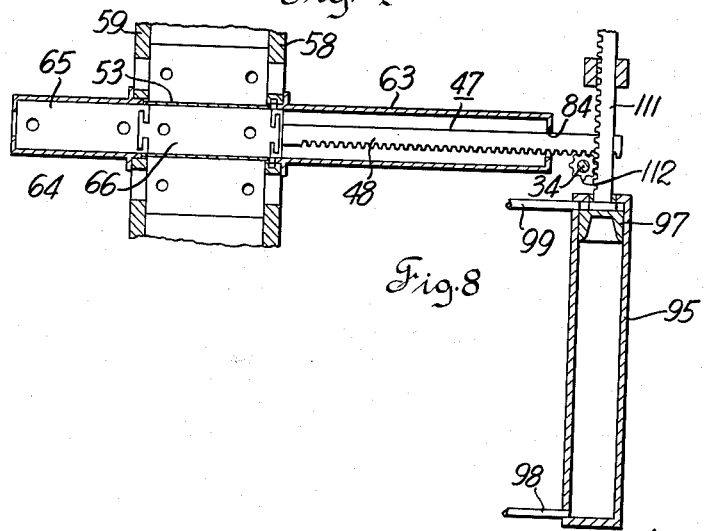

Upon a scram signal, the magnetic clutch 94 and the solenoid valve (not shown) are deenergized. The valve is automatically positioned to direct compressed air into the cylinder 95 through pipe 98 and drive the plunger 97 to the scram position (FIG. 8). A dashpot (not shown) may be provided in the cylinder 95 to absorb the impact of the plunger 97 at scram velocity. It is equally possible to use spring loaded solenoid valves to control the flow of air through pipes 98 and 99, respectively, into and out of the scram cylinder 95.

Three control rod drive mechanisms 36 are provided and are arranged so that each mechanism 36 drives a gang of three control rod assemblies 47. Each of the three pinion gears 93 (FIG. 7) utilized to drive the three racks 48 includes a two-way slip clutch (not shown) to permit any rod 47 in a gang of three to be operated if one or two become inoperable. If desired, the mechanism 36 may be adapted to operate with standby battery power in event the main power source is interrupted.

To provide adequate circulation of coolant through the core, the fuel assemblies 51, 51' are open at the ends thereof, the guide sleeve extensions 63, 64 are provided with apertures 84 (FIG. 4) at the ends thereof, and each control assembly 47 (FIG. 7) has apertures 89 defined in the ends of each section therein. In addition, slots 91 such as shown in FIG. 11 may be defined in the side plates 81 of the fuel assemblies 51, 51'. Similar slots, not shown, may be provided in the side plates of control rod fuel and poison sections 65, 66 and in the guide sleeves 53 to permit convective circulation therethrough during reactor shutdown.

It will be appreciated that the reactor and associated equipment are provided with a biological shield as is conventional in the art. As utilized in the present embodiment and shown in FIG. 3, the shielding comprises thermal insulation 100, a layer of iron shot, water and boron 101 and a layer of polyethylene 102.

As shown in FIG. 1, the vessel 10 and the reactor auxiliary equipment are disposed in the lower portion and along the longitudinal axis of a submarine hull 103. A hatchway 104 (FIG. 3) aligned with refueling port 21 is defined in the upper portion of hull 103 and is suitably sealed by a removable hatch 104'.

Access to the port cover plate 22 (FIG. 3) through the shielding is provided by an extension 37' of the refueling port 21 having a second or outer shield plug 49 disposed therein removably secured to the extension 37 by conventional means such as bolts.

In general, the herein disclosed reactor produces thermal energy in accordance with well known principles of nuclear physics. The core elements are inserted in place within the shroud 55 of the reactor by the grappling tool 90 through refueling port 21 in vessel 10. The refueling port cover 22 is attached to close the vessel 10 and primary coolant is introduced therein. Pumps 17 (FIG. 17) circulate the coolant through coolant circuit 16 which includes a heat exchanger 13 wherein steam is generated. The generated steam flows in steam circuit 14 through turbines 11, 11' and the exhaust flows to condenser 15 and the cycle is repeated.

It will be appreciated that other necessary associated auxiliary equipment is conventional and includes such items as a pressurizing system, a coolant presssure relief system, any necessary nuclear instrumentation, coolant purification and replacement systems and emergency equipment such as schematically shown in FIG. 17.

After the reactor has operated for its useful life, it is necesary to refuel the reactor core. Any fuel handling procedures approved by the Atomic Energy Commission may be utilized to refuel the reactor. In the refueling process the removable core elements comprising six dummy elements 52, forty-eight fuel element assemblies 51, twelve fuel element assemblies 51', nine control rod guide sleeves 53, nine control rod fuel sections 65 and nine control rod poison sections 66 may be removed.

A grappling tool 90 having means to securely engage the end portion of each removable core element removes each core element generally endwise from the vessel 10 through refueling port 21.

Grappling tool 90 comprises a rectangular bar 105 having a surface 106 for abutting the core elements, handles 107, 107' pivotally mounted remote from surface 106 and remote from each other, and a locking arrangement to securely engage individual core elements to the grappling tool 90. The locking arrangement comprises a pin 108 fixedly projecting from surface 106 at one end of bar 105, and a biasing member such as spring 109 yieldingly projecting from surface 106 at the other end of bar 105. To actuate the locking arrangement, the pin 108 is aligned with a core element hole 75 or bore 74 and the spring 109 is compressed to cause surface 106 to abut the surface of a core element thereby permitting pin 108 to be fully inserted into hole 75 or bore 74. The pin 108 is proportioned to freely enter hole 75 or bore 74 but upon release of the compressed spring 109 it is cocked in the hole and becomes jammed so that it will securely lock any desired core element to the block 105. The core element may then be manipulated by pulling upward on either or both handles 107, 107'. In order to release the core element from the grappling tool, the core element may be placed on any suitable supporting surface and the handle 107' is pushed down while the handle 107 is pulled up.

It is to be be noted that the core elements have a longitudinal dimension greater than the diameter of refueling port 21. However, the pivoted handles 107, 107' permit the core elements to be transferred in a generally endwise direction through refueling port 21.

The shroud 55 is unloaded sequentially beginning with the top row of core elements. In the rows having control rod guide sleeves 53 and control rod assemblies 47, the removable portions are removed as follows:

(1) The control rod assembly 47 is withdrawn into control rod guide sleeve extension 63 (see FIG. 10);

(2) Keyed spacer 73 (FIG. 15) is removed from keyway 71;

(3) Grappling tool 90 is manipulated to engage and remove guide sleeve 53;

(4) Assembly 47 is actuated to advance fuel section 65 into the core space as shown by FIG. 9 to permit tool 90 to engage and remove fuel section 65; and (5) Rack 48 is further actuated to advance poison section 66 into the core space to permit tool 90 to engage and remove poison section 66.

In reloading the core, a reverse procedure is followed. That is, the shroud 55 is loaded sequentially with core elements beginning at the bottom, and control rod assemblies 47 are reassembled by attaching the poison section to the rack, the fuel section to the poison section and replacing the guide sleeve. The fully loaded shroud is thus ready to be covered by hold down plate 43 which is secured by tripod 42 depending from shield plug 40. The vessel cover 22 is replaced and the reactor is ready for operation.

The forty-eight fuel element assemblies 51 are divided into two groups; a radially innermost and a radially outermost group shown in FIG. 3 as elements a–x and A–X, respectively. In unloading the core, the twenty-four fuel elements assemblies 51 identified as core elements A–X are maintained separate from the other removed elements and may be used in reloading the core, being disposed in the spaces formerly occupied by core elements a–x. All other fuel bearing core elements are replaced with new fuel bearing elements.

The dummy fuel elements 52 and the control rod poison sections 66 are ordinarily reloaded into the core and do not require replacement unless damaged.

The reactor will again be in condition for operation with the essential properties of a fully charged reactor core.

It is understood that this invention is not to be limited to the details given herein, but that it may be modified within the scope of the appended claims.

What is claimed is:

1. In a mobile unit, a nuclear reactor affording a source of propelling power for said unit and comprising an elongated horizontally disposed pressure vessel mounted to extend lengthwise in the direction of propulsion of said unit and having an access opening at its top; a reactor core structure mounted within said pressure vessel and comprising a plurality of elongated fuel assemblies and a plurality of elongated control rod assemblies adapted for generally endwise individual movement thereof through said access opening; means for releasably securing said fuel assemblies within said vessel in stacked condition so as to position said fuel assemblies lengthwise in the longitudinal direction of said vessel; drive means for reciprocating said control rod assemblies lengthwise in parallel relation to said fuel assemblies; and releasable connecting means between said drive means and control rod assemblies permitting vertical separation of said control rod assemblies from said drive means.

2. A mobile unit as set forth in claim 1 and further comprising guide sleeves for said control rod assemblies, respectively, adapted for generally endwise individual movement thereof through said access opening, and means for releasably securing said guide sleeves within said vessel in side by side relation to said fuel assemblies; said drive means for said control rod assemblies being connected to one end of the latter and operable so as to advance the other end of said control rod assemblies through said guide sleeves upon movement of said drive means in one direction, and so as to withdraw said control rod assemblies entirely from said guide sleeves upon movement of said drive means in the opposite direction.

3. A mobile unit as set forth in claim 2 wherein each of said fuel assemblies and each of said guide sleeves has a transverse aperture adapted to receive a stud portion of a grappling tool insertable through said access opening.

4. A mobile unit as set forth in claim 2 wherein each of said control rod assemblies comprises an elongated poison section, and coupling means operatively connecting said poison section at one end thereof in transversely separable relation with said drive means.

5. A mobile unit as set forth in claim 2 wherein each of said control rod assemblies comprises an elongated poison section, coupling means operatively connecting said poison section at one end thereof in transversely separable relation with said drive means; an elongated fuel section; and coupling means operatively connecting said fuel section in transversely separable relation to the other end of said poison section.

6. A mobile unit as set forth in claim 5, wherein said poison section and said fuel section of each of said control rod assemblies has a transverse aperture adapted to receive a stud portion of a grappling tool insertable through said access opening.

References Cited by the Examiner

UNITED STATES PATENTS

| | | | |
|---|---|---|---|
| 2,825,688 | 3/58 | Vernon | 176—55 |
| 2,857,324 | 10/58 | Boisblanc | 176—61 |
| 2,861,033 | 11/58 | Treshow | 176—56 |
| 2,865,828 | 12/58 | Long | 176—41 |
| 2,935,456 | 5/60 | Huston | 176—34 |
| 2,938,845 | 5/60 | Treshow | 176—54 |
| 2,983,659 | 5/61 | Treshow | 176—27 |
| 2,990,353 | 6/61 | Howard | 176—25 |
| 2,998,370 | 8/61 | Gaunt | 176—85 |

FOREIGN PATENTS

| | | |
|---|---|---|
| 1,216,786 | 11/59 | France. |
| 1,228,915 | 3/60 | France. |
| 817,265 | 7/59 | Great Britain. |

CARL D. QUARFORTH, *Primary Examiner.*

REUBEN EPSTEIN, *Examiner.*